United States Patent
Venzmer et al.

(10) Patent No.: US 7,759,402 B2
(45) Date of Patent: Jul. 20, 2010

(54) USE OF GRAFTED POLYETHERSILOXANE COPOLYMERS FOR IMPROVING THE LOW-TEMPERATURE STABILITY OF ANTIFOAMS IN AQUEOUS DISPERSIONS

(75) Inventors: Joachim Venzmer, Essen (DE); Sascha Herrwerth, Essen (DE); Sandra Maslek, Alsfeld (DE); Christian Mund, Essen (DE); Peter Schwab, Essen (DE)

(73) Assignee: Evonik Goldschmidt GmbH, Essen (DE)

( * ) Notice: Subject to any disclaimer, the term of this patent is extended or adjusted under 35 U.S.C. 154(b) by 397 days.

(21) Appl. No.: 11/847,607

(22) Filed: Aug. 30, 2007

(65) Prior Publication Data

US 2009/0093598 A1 Apr. 9, 2009

(30) Foreign Application Priority Data

Sep. 1, 2006 (DE) .................. 10 2006 041 089

(51) Int. Cl.
*B01D 19/04* (2006.01)
*C08G 77/46* (2006.01)
*C08G 77/442* (2006.01)

(52) U.S. Cl. .............. 516/118; 526/303.1; 526/317.1; 526/318; 526/332; 528/25; 528/29; 528/31

(58) Field of Classification Search ............... None
See application file for complete search history.

(56) References Cited

U.S. PATENT DOCUMENTS

| | | | | | |
|---|---|---|---|---|---|
| 3,418,354 | A | * | 12/1968 | Wheeler, Jr. | 556/444 |
| 3,478,075 | A | * | 11/1969 | Jack et al. | 556/419 |
| 4,368,290 | A | * | 1/1983 | Alberts et al. | 525/29 |
| 5,032,662 | A | * | 7/1991 | Berger et al. | 528/25 |
| 6,187,891 | B1 | * | 2/2001 | Rautschek et al. | 528/25 |

* cited by examiner

*Primary Examiner*—Marc S Zimmer
(74) *Attorney, Agent, or Firm*—Frommer Lawrence & Haug LLP

(57) ABSTRACT

The object of the present invention is to provide antifoams which have a good antifoam effect in aqueous dispersions of polymeric organic substances, cause no wetting defects when these dispersions are applied to a surface and at the same time retain their antifoam activity even after prolonged storage at temperatures down to the freezing point.

15 Claims, No Drawings

USE OF GRAFTED POLYETHERSILOXANE COPOLYMERS FOR IMPROVING THE LOW-TEMPERATURE STABILITY OF ANTIFOAMS IN AQUEOUS DISPERSIONS

This application claims benefit under 35 U.S.C. 119(a) of German patent application DE 10 2006 041 089.0, filed on 1 Sep. 2006.

Any foregoing applications, including German patent application DE 10 2006 041 089.0, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The use of polyoxyalkylene polysiloxane block copolymers, also known as polyethersiloxanes, as antifoams for defoaming aqueous solutions or dispersions is known and is described, for example, in DE-A-1 012 602 (U.S. Pat. No. 2,917,480).

The antifoam properties in these applications can be substantially improved, in particular by using water-insoluble block copolymers of this type. Such a preparation for defoaming aqueous solutions or dispersions is described in DE-A-2 443 853. Mixtures of organic oils, such as, for example, esters of alcohols and fatty acids and a polydimethylsiloxane-polyoxyalkylene block polymer are likewise described as antifoam formulations, as claimed, for example, in U.S. Pat. No. 4,028,218 and DE-A-31 23 103.

These preparations known from the prior art and containing polyoxyalkylene-polysiloxane block copolymers are more or less suitable for avoiding the foam formation of aqueous solutions or aqueous dispersions but have the disadvantage that they cause wetting defects on application to surfaces when used in dispersions of binders, coating materials and adhesives. Such wetting defects, which manifest themselves by non-uniform wetting of the substrate or by the formation of defects of different sizes, occur to a particular extent in the case of aqueous dispersions of polyurethanes.

DE-A-38 07 247 (U.S. Pat. No. 5,032,662) claims polyoxyalkylene-polysiloxane block copolymers which exhibit a good antifoam effect in aqueous dispersions of polymeric organic substances but at the same time do not cause any wetting problems on application of these dispersions to a surface. This also applies in particular to the application of antifoam-containing dispersions of binders, coating materials and adhesives.

However, it has been found that the aqueous dispersions of polymeric organic substances to which such preparations have been added have disadvantages in use. In particular, the antifoams used partly or completely lose their antifoam activity after cooling of the dispersion to certain temperatures occurring in practice, for example during storage, such as, for example, 5° C.

It is therefore the object of the present invention to provide novel antifoams which exhibit a good antifoam effect in aqueous dispersions of polymeric organic substances, cause no wetting problems when these dispersions are applied to a surface and at the same time retain their antifoam activity even after prolonged storage at temperatures occurring in practice, down to the freezing point.

This object of the invention can surprisingly be achieved by using grafted polyoxyalkylene-polysiloxane block copolymers P which have been obtained by grafting ethylenically unsaturated compounds (monomers) M onto polyoxyalkylene-polysiloxane block copolymers or onto corresponding precursors. An object of the invention is therefore the use of grafted p block copolymers P as claimed in the claims.

For the preparation of the grafted copolymers P to be used according to the invention, two processes are in principle suitable. In the first process, the polyethersiloxanes are prepared before the grafting step; in the second process, the polyethers are first grafted, and the grafted polyethers are then reacted with the corresponding siloxanes to give grafted polyethersiloxanes P to be used according to the invention. The products to be used according to the invention can be prepared by both processes in such a way that they cannot be distinguished.

The polyoxyalkylene-polysiloxane block copolymers which can serve as a grafting base are described by the following formula (I)

$$R^1\text{—}O\text{—}(A)_p\text{—}(B\text{—}A)_m\text{—}B\text{—}(A)_q\text{—}R^1 \quad (I)$$

in which the radical

A is a Polyoxyalkylene Block of the Average Formula (II)

$$[(C_2H_{4-d}R'_dO)_n(C_xH_{2x}O)_r(C_2H_{4-d}R''_dO)_t] \quad (II)$$

in which d is from 1 to 3, n is $\geq 0$, x is from 2 to 10, r is $\geq 0$, t is $\geq 0$, n+r+t is $\geq 1$, and R' is a monovalent aromatic, optionally substituted hydrocarbon radical, R" is a hydrogen radical or a monovalent hydrocarbon radical having 1 to 18 C atoms, $R^1$ is an H atom, a monovalent organic linear or branched alkyl radical having the chain length $C_1$-$C_{40}$ or a carboxyl radical of an optionally branched alkyl or aryl ester, B is a Polysiloxane Block of the Average Formula (III)

$$\begin{bmatrix} R^2 \\ | \\ Si\text{—}O\text{—} \\ | \\ R^2 \end{bmatrix}_y \quad (III)$$

in which $R^2$ are identical or different and comprise an alkyl radical having 1 to 4 carbon atoms or a phenyl radical and y has a value from 5 to 200, m has a value from 2 to 100, p has a value from 0 to 1 and
q has a value from 0 to 1,
or by the formula (IV)

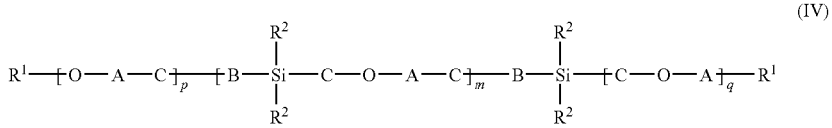

(IV)

in which the radicals $R^1$, A, B and m, p and q have the abovementioned meaning and C is a linear or branched alkylene radical having 2 to 20 carbon atoms.

The polyoxyalkylene block A of the general formula (II) may also comprise mixtures of different polyoxyalkylene blocks.

Those polyoxyalkylene-polysiloxane block copolymers in which all radicals $R^2$ are methyl radicals are particularly preferred. The radical $R^1$ is preferably a hydrogen radical or an alkyl radical having chain lengths between $C_1$ and $C_6$.

The index m, which has an average value of from 3 to 20, preferably from 4 to 15, particularly preferably from 5 to 13, in the case of the block copolymers used according to the invention, assumes a particularly distinctive significance.

The polyethers PE used for the preparation of the grafted copolymers P according to the second process include all the difunctional polyethers PE which, after the grafting process, can be linked linearly to α,ω-functional siloxanes so that $(AB)_n$ structures form.

A multiplicity of suitable polyether derivatives PE is available as the grafting base.

Particularly suitable polyether derivatives PE are those of the general formula (V)

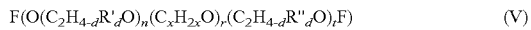

having the meaning
d from 1 to 3,
$n \geq 0$,
x from 2 to 10,
$r \geq 0$,
$t \geq 0$,
$n+r+t \geq 1$,
F an H atom or a functional optionally branched hydrocarbon radical having 1 to 18 C atoms,
R' a monovalent aromatic, optionally substituted hydrocarbon radical,
R" a hydrogen radical or a monovalent hydrocarbon radical having 1 to 18 C atoms.

Dihydroxy-Functional Polyethers of the General Formula (VI)

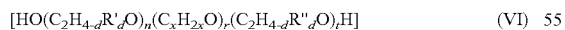

in which R', R", d, n, x, t and r have the abovementioned meanings, are particularly preferred.

The grafted difunctional polyethers, optionally after further chemical modification, are then reacted with α,ω-difunctional siloxanes according to the methods known to the person skilled in the art to give the grafted polyethersiloxane copolymers P according to the invention. The reaction of grafted dihydroxy-functional polyethers with α,ω-SiH-siloxanes or α,ω-SiCl-siloxanes is particularly preferred.

The dihydroxy-functional polyethers required for this purpose are obtained from a dihydroxy-functional initiator alcohol or water by an addition reaction with monomers. Suitable monomers are ethylene oxide, propylene oxide, compounds from the group consisting of tetrahydrofuran, 1,2-epoxybutane (n-butylene oxide), 2,3-epoxybutane (isobutylene oxide), dodecyl oxide, and styrene oxide and/or methylstyrene oxide. The distribution of the monomers may be chosen as desired, so that, for example, blocks may be present. In addition, a mixture of the monomers may also be used, so that polyethers in which the units are present in random distribution are obtained.

The monomers M can be homopolymerized or copolymerized using conventional synthetic methods in the presence of the block copolymers. For example, these may be solution polymerization, emulsion polymerization, inverse emulsion polymerization, suspension polymerization, inverse suspension polymerization or precipitation polymerization, without the methods which can be used being limited thereto. In solution polymerization, water and customary organic solvents and the polyoxyalkylene-polysiloxane block copolymers themselves can be used as solvents. However, the last-mentioned process is preferred.

The grafted copolymers P used according to the invention may contain any relative amounts of olefin grafted on the polyethersiloxane. Preferred ratios are in general from 5 to 100% by weight of the monomer M, based on the polyethersiloxane base in each case. Particularly preferred ratios are in the range from 7 to 40% by weight, based on the polyethersiloxane base in each case.

Monomers M which may be used are substances which can be polymerized by a reaction initiated by free radicals.

Suitable monomers M are hydrocarbons having at least one carbon-carbon double bond, for example derivatives of acrylic acid and methacrylic acid, as described by the general formula (VII)

in which
X is selected from the group consisting of the radicals OH, OL, $OR^8$, $NH_2$, $NHR^8$ and $N(R^8)_2$,
L is a cation selected from the group consisting of $Na^+$, $K^+$, $Mg^{2+}$, $Ca^{2+}$, $Zn^{2+}$, $NH_4^+$, alkylammonium, dialkylammonium, trialkylammonium, tetraalkylammonium and analogous phosphonium derivatives,
$R^7$ and $R^6$, independently of one another, are selected from the group consisting of: —H, linear or branched $C_1$-$C_8$-alkyl chains, methoxy, ethoxy, 2-hydroxyethoxy, 2-methoxyethoxy and 2-ethoxyethyl,
$R^8$ may be derived from linear $C_1$-$C_{40}$-alkyl radicals, branched $C_3$-$C_{40}$-alkyl radicals, aromatic alkyl radicals or carbocyclic $C_3$-$C_{40}$-alkyl radicals, from polyfunctional alcohols having 2 to 10 hydroxyl groups, such as ethylene glycol, hexylene glycol, glycerol and 1,2,6-hexanetriol, or from alcohol ethers, such as methoxy ethanol and ethoxy ethanol or polyethylene glycols.

Further suitable monomers M are vinyl ethers, vinyl alcohols, styrene, derivatives of styrene and mixtures of these monomers.

Other suitable monomers M are vinyl and allyl esters of linear $C_1$-$C_{40}$-carboxylic acids, branched $C_3$-$C_{40}$-carboxylic acids or carbocyclic $C_3$-$C_{40}$-carboxylic acids (e.g.: vinyl acetate, vinyl propionate, vinyl neononanoate, vinyl neoundecanoic acid or vinyl tert-butylbenzoate), vinyl halides, preferably vinyl chloride, and vinyl ethers, preferably methyl, ethyl, butyl or dodecyl vinyl ether.

Furthermore suitable are N-vinylimidazoles of the general formula (VIII), in which $R^{14}$ to $R^{16}$, independently of one another, are hydrogen, $C_1$-$C_8$-alkyl or phenyl:

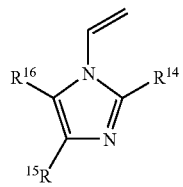

(VIII)

N,N-Dialkylaminoalkyl acrylates and methacrylates and N-dialkylaminoalkyl acrylamides and -methacrylamides of the general formula (IX)

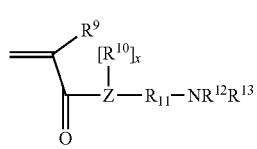

(IX)

where $R^9$ is H, or alkyl having 1 to 8 C atoms, $R^{10}$ is H or methyl, $R^{11}$ is alkylene having 1 to 24 C atoms, optionally substituted by alkyl, $R^{12}$, $R^{13}$ are a $C_1$-$C_{40}$-alkyl radical, Z is nitrogen for x=1 or oxygen for x=0, are furthermore suitable.

The amides may be unsubstituted, N-alkyl- or N-alkylamino-monosubstituted or N,N-dialkyl-substituted or N,N-dialkylamino-disubstituted, wherein the alkyl or alkylamino groups are derived from linear $C_1$-$C_{40}$, branched $C_3$-$C_{40}$ or carbocyclic $C_3$-$C_{40}$ units.

Preferred monomers of the formula (IX) are N,N-dimethylaminomethyl (meth)acrylate, N,N-diethylaminomethyl (meth)acrylate, N,N-dimethylaminoethyl (meth)acrylate, N,N-diethylaminoethyl (meth)acrylate, and N,N-dimethylaminopropyl (meth)acrylate.

Particularly suitable monomers M are methyl acrylate, ethyl acrylate, propyl acrylate, n-butyl acrylate, isobutyl acrylate, tert-butyl acrylate, 2-ethylhexyl acrylate, decyl acrylate, benzyl acrylate, benzyl methacrylate, methyl methacrylate, ethyl methacrylate, propyl methacrylate, n-butyl methacrylate, isobutyl methacrylate, tert-butyl methacrylate, 2-ethylhexyl methacrylate, decyl methacrylate, methyl ethacrylate, ethyl ethacrylate, n-butyl ethacrylate, isobutyl ethacrylate, tert-butyl ethacrylate, 2-ethylhexyl ethacrylate, decyl ethacrylate, 2,3-dihydroxypropyl acrylate, 2,3-dihydroxypropyl methacrylate, 2-hydroxyethyl acrylate, hydroxypropyl acrylates, 2-hydroxyethyl methacrylate, 2-hydroxyethyl ethacrylate, 2-methoxyethyl acrylate, 2-methoxyethyl methacrylate, 2-methoxyethyl ethacrylate, 2-ethoxyethyl methacrylate, 2-ethoxyethyl ethacrylate, hydroxypropyl methacrylates, glyceryl monoacrylate, glyceryl monomethacrylate, polyalkylene glycol (meth)acrylates, unsaturated sulfonic acids, vinyl ethers (for example: methyl, ethyl, butyl, or dodecyl vinyl ether), methyl vinyl ketone, vinylfuran, styrene, alpha-methylstyrene, meta-methylstyrene, methylstyrene isomer mixture, tert-butylstyrene, vinyltoluene, styrene sulfonates and mixtures thereof.

In addition to the abovementioned monomers, so-called macromonomers, such as, for example, ether-containing macromonomers having one or more groups capable of free radical polymerization or alkyloxazoline macromonomers, as described, for example, in EP-A-408 311 (U.S. Pat. No. 5,166,276), can be used as monomers M.

Furthermore, fluorine-containing monomers, as described, for example, in EP-B-558 423, crosslinking compounds or compounds which regulate the molecular weight can be used in combination or alone.

A customary compound known to the person skilled in the art, such as, for example, sulfur compounds, (e.g.: mercaptoethanol, 2-ethylhexyl thioglycolate, thioglycolic acid or dodecyl mercaptan) and tribromochloromethane or other compounds which regulate the molecular weight of the polymers obtained, can be used as regulators. Ether compounds containing thiol groups can optionally also be used. However, ether-free regulators are preferably used and the synthesis conditions are adjusted so that no regulators have to be used.

Compounds having at least two ethylenically unsaturated double bonds, such as, for example, esters of ethylenically unsaturated carboxylic acids, such as acrylic acid or methacrylic acid, and polyhydric alcohols, ethers of at least dihydric alcohols, such as, for example, vinyl ether or allyl ether, can be used as crosslinking monomers. Also suitable are straight-chain or branched, linear or cyclic aliphatic or aromatic hydrocarbons which, however, carry at least two double bonds, which must not be conjugated in the case of the aliphatic hydrocarbons. Further suitable crosslinking agents are divinyldioxane, tetraallylsilane or tetravinylsilane.

Particularly preferred crosslinking agents are, for example, reaction products of polyhydric alcohols with acrylic acid or methacrylic acid, methacrylates and acrylates of polyalkylene oxides or polyhydric alcohols which have been reacted with ethylene oxide and/or propylene oxide and/or epichlorohydrin. As is familiar to the person skilled in the art, however, the molecular weights can be adjusted so that no crosslinking agents are necessary.

The graft polymerization is initiated by free radical initiators, such as organic peroxides, e.g. dibenzoyl peroxide, diacetyl peroxide or dilauroyl peroxide, by azo substances, such as, for example, azobisisobutyronitrile, or by any other substance which liberates free radicals thermally. Redox systems, such as, for example, dibenzoyl peroxide/benzoin, may also be used. Furthermore, activation by irradiation is also suitable.

Said initiators are used in amounts of from about 0.01 to 10% by weight, preferably from 0.1 to 3%, based on the total amount of polyether and monomers.

The temperature chosen for the reaction depends on the free radical-forming compound used. If the free radical formation is thermally induced, the half-life of the decomposition to the primary fragments plays a decisive role and can be chosen so that a desired ratio of free radicals is always established in the reaction mixture. Suitable temperature ranges are from 30° C. to 225° C., with an upper limit due to the thermal decomposition of the grafting base.

The diallylpolyethers required, for example, for the preparation of the polyoxyalkylene-polysiloxane block copolymers described in formula (IV) are obtained by reacting an initiator alcohol, which is preferably allyl alcohol, by an addition reaction of monomers. Suitable monomers are ethylene oxide, propylene oxide, compounds from the group consisting of tetrahydrofuran, 1,2-epoxybutane (n-butylene oxide), 2,3-epoxybutane (isobutylene; oxide), dodecyl oxide and styrene oxide and/or methylstyrene oxide. The distribution of the monomers can be chosen as desired, so that, for example, blocks may be present. In addition, it is also possible to use a mixture of the monomers so that polyethers in which the units are present in random distribution are obtained. The terminal OH group can then be reacted with allyl chloride or methallyl chloride to give the desired diallylpolyether or allylmethallylpolyether, respectively.

The polyoxyalkylene-polysiloxane block copolymers described in the formula (IV) are prepared by reacting the diallyl polyethers or allylmethallylpolyethers thus obtained with polysiloxanes by an addition reaction with terminal SiH groups in the polysiloxane in the presence of a hydrosilylation catalyst. According to the prior art, platinum, palladium or rhodium catalysts can be used. According to the prior art, a small proportion of monofunctional polyether or monofunctional, terminal alkene or a mixture of monofunctional polyethers and alkenes is admixed in order to control the chain length.

The dihydroxy-functional polyethers required for the preparation of the polyoxyalkylene-polysiloxane block copolymers described in formula (I) are obtained from a dihydroxy-functional initiator alcohol or water by an addition reaction of monomers. Ethylene oxide, propylene oxide, a compound from the group consisting of tetrahydrofuran, 1,2-epoxybutane (n-butylene oxide), 2,3-epoxybutane (isobutylene oxide), dodecyl oxide and styrene oxide and/or methylstyrene oxide are suitable. The distribution of the monomers can be chosen as desired, so that, for example, blocks may be present. In addition, a mixture of the monomers can also be used so that polyethers in which the units are present in random distribution are obtained.

The polyoxyalkylene-polysiloxane block copolymers described in the formula (I) are prepared by reacting the dihydroxy-functional polyethers thus obtained with polysiloxanes by condensation with terminal SiH groups of polysiloxane in the presence of a coupling catalyst, according to the prior art, for example, of a borane catalyst, or by the reaction of polysiloxanes which contain terminal SiCl groups. According to the prior art, a small proportion of monofunctional polyether or monofunctional alcohol or a mixture of monofunctional polyether and alcohol is admixed in order to control the chain length.

According to the prior art, it is possible to add up to 20% by weight of inorganic or organic finely divided solids to the grafted copolymers P to be used according to the invention, based on said copolymers. Examples of inorganic solids are optionally hydrophobized silica, alumina, alkaline earth metal carbonates or similar customary finely divided solids known from the prior art. Organic finely divided substances which may be used are the alkaline earth metal salts of long-chain fatty acids having 12 to 22 carbon atoms, which salts are known for this purpose, or the amides of these fatty acids. Further suitable organic solids are derivatives of urea, which can be obtained by reacting isocyanates with amines.

The grafted copolymers P to be used according to the invention can be used as such or in the form of aqueous dispersions. The use of dispersions is preferred owing to the better possibilities of metering. In particular, aqueous dispersions having a content of from 5 to 50% by weight of grafted copolymers are used.

The invention is further described by the following non-limiting examples which further illustrate the invention, and are not intended, nor should they be interpreted to, limit the scope of the invention.

In the following examples, the preparation of the compounds to be used according to the invention is first described. These are followed by use examples for demonstrating the properties of the compounds according to the invention and, in comparison therewith, properties which can be achieved with known products of the prior art.

EXPERIMENTAL EXAMPLES

Reference Example 1

Preparation of a Dihydroxy-Functional Polyether

Ethylene oxide/propylene oxide-containing block copolymer (MW≈5400, 40% EO proportion), prepared according to the prior art. For example, 45 g of n-butanediol and 7 g of potassium methanolate were initially introduced into a pressure reactor and heated to 100° C. Thereafter, 3240 g of propylene oxide and then 2160 g of ethylene oxide were metered in over several hours and reacted for a further hour at 100° C. After cooling to 80° C., the reaction mixture was neutralized and filled.

Reference Example 2

Preparation of a Dihydroxy-Functional Polyether

Ethylene oxide/propylene oxide-containing block copolymer (MW=650, 50% EO proportion), prepared according to the prior art. For example, 1 mol of $H_2O$ and KOH were initially introduced into a pressure reactor and heated to 100° C. Thereafter, 324 g of propylene oxide were metered in over several hours and, after a subsequent reaction time of 1 h, 216 g of ethylene oxide were metered in over several hours. After a further reaction time of 1 h at 100° C. and cooling to 80° C., the reaction mixture is neutralized and filled.

Reference Example 3

Preparation of an Allylpolyether

Ethylene oxide/styrene oxide-containing block copolymer (MW=600, 70% EO proportion), prepared according to the prior art. For example, 58 g of allyl alcohol and KOH were initially introduced into a pressure reactor and heated to 120° C. Thereafter, 120 g of styrene oxide were metered in over several hours and, after a subsequent reaction time of 1 h, 440 g of ethylene oxide were metered in at 100° C. over several hours. After a further reaction time of 1 h at 100° C. and cooling to 80° C., the reaction mixture was neutralized and filled.

Reference Example 4

Preparation of an Allylpolyether

Ethylene oxide/styrene oxide-containing block copolymer (MW=600, 70% EO proportion), prepared according to the prior art. For example, 58 g of allyl alcohol and KOH were initially introduced into a pressure reactor and heated to 100° C. Thereafter, 440 g of ethylene oxide were metered in over several hours and, after a subsequent reaction time of 1 h, 120 g of styrene oxide were metered in at 120° C. over several hours. After a further reaction time of 1 h at 120° C. and cooling to 80° C., the reaction mixture was neutralized and filled.

Reference Example 5

Preparation of a Diallylpolyether

The allylpolyether prepared in example 4 (1 mol) was initially introduced, degassed (vacuum from 10 to 20 mbar) and nitrogen was passed through. While cooling with ice, 1.5 mol of cold 50% strength sodium hydroxide solution were added, the temperature not exceeding 25 to 30° C. 1.7 mol of allyl chloride were then added dropwise in the course of 90 min. The reaction was strongly exothermic. By regulating the rate of dropwise addition, the temperature was kept just below the boiling point of allyl chloride (<45° C.). A slightly yellow to orange suspension formed. After the end of the addition, heating was effected for one hour under reflux (60° C.). The unreacted allyl chloride was then distilled off at 60° C. under pressure of 100 mbar. The suspension was filtered. After transfer to a separating funnel, the aqueous phase was separated off and discarded. For removal of organic byproducts formed during the reaction, distillation was effected at 60° C. and 20 mbar (60 min). Thereafter, drying was effected over sodium sulfate with vigorous stirring (12 h) and filtration was carried out. A clear, yellow to orange product was obtained.

Reference Example 6

Preparation of an $(AB)_n$-polyethersiloxane (Formula (I))

712 g of the polyether from reference example 1 (OH number=50, n=2.9) were initially introduced into a three-necked flask having a stirrer, distillation bridge and gas inlet tube, and the same amount of toluene was added. After about 200 g of toluene had been distilled off for azeotropic drying of the polyether, the mixture was cooled to 75° C., the distillation bridge was exchanged for a dropping funnel and 288 g of an $\alpha,\omega$-dichlorodimethylpolysiloxane (B) (x=15) were added dropwise in the course of 30 min. After a subsequent reaction time of 1 h at 80° C., neutralization was effected with ammonia, ammonium chloride was filtered off and the product was freed from solvent.

Reference Example 7

Preparation of an $(AB)_n$-polyethersiloxane (Formula (IV))

2.8 mol of the polyether prepared in example 5 and 0.2 mol of 1-hexene together with 3 mol of an $\alpha,\omega$-SiH-siloxane (N=50, SiH=0.55) and 10 ppm of platinum catalyst were initially introduced into a three-necked flask and heated to 90° C. with stirring. After a subsequent reaction time of 1 h at 120° C., the clear product was distilled under vacuum (<5 mbar) from an oil pump, filtered and filled.

Reference Example 8

Preparation of an $(AB)_n$-polyethersiloxane (Formula (IV))

6.5 mol of the polyether prepared in example 5 and 0.5 mol of the allylpolyether prepared in example 4, together with 7 mol of a siloxane having SiH side groups (20.5/5, SiH=2.52) and 10 ppm of platinum catalyst, were initially introduced into a three-necked flask and heated to 90° C. with stirring. After a subsequent reaction time of 1 h at 120° C., the clear product was distilled under a vacuum (<5 mbar) from an oil pump, filtered and filled.

Reference Example 9

Process 1

Reaction of an $(AB)_n$-polyethersiloxane with Styrene Using Trigonox® 117 as an Initiator:

100 g of polyethersiloxane from example 6 were heated to 140° C. in a four-necked flask equipped with a stirrer, jacketed coiled condenser, thermometer and dropping funnel under a nitrogen atmosphere. On reaching the temperature, 20 g of styrene and 1.8 g of Trigonox® 117 were added dropwise in the course of 60 minutes, an exothermic reaction being observed. The reaction mixture was then kept at 150° C. for one hour. Thereafter, with the use of a distillation bridge, residual monomers were distilled off at 145° C. and under a vacuum from an oil pump. A colorless, clear product was obtained.

Reference Example 10

Process 1

Reaction of an $(Ab)_n$-polyethersiloxane with Butyl Methacrylate using Trigonox® B as an Initiator:

100 g of polyethersiloxane from reference example 6 were heated to 160° C. in a four-necked flask equipped with a stirrer, jacketed coiled condenser, thermometer and dropping funnel under a nitrogen atmosphere. On reaching the temperature, 20 g of butyl methacrylate and 3.6 g of Trigonox® B were added dropwise in the course of 60 minutes, an exothermic reaction being observed. The reaction mixture was then kept at 160° C. for one hour. Thereafter, with the use of a distillation bridge, residual monomers were distilled off at 145° C. and under a vacuum from an oil pump. A yellowish, clear product was obtained. The $^1$H NMR spectrum of the product showed that the benzylic position on the polyether ($\delta$=4.7 to 4.9 ppm) is preferably grafted.

Reference Example 11

Process 1

Reaction of an $(Ab)_n$-polyethersiloxane with Butyl Acrylate Using Trigonox® D-C50 as an Initiator:

100 g of polyethersiloxane from reference example 6 were heated to 140° C. in a four-necked flask equipped with a stirrer, jacketed coiled condenser, thermometer and dropping funnel under a nitrogen atmosphere. On reaching the temperature, 10 g of butyl acrylate and 3.4 g of Trigonox® 201 were added dropwise in the course of 60 minutes, an exothermic reaction being observed. The reaction mixture was then kept at 150° C. for one hour. Thereafter, with the use of a distillation bridge, residual monomers were distilled off at 145° C. and under a vacuum from an oil pump. A yellowish, clear product was obtained.

Reference Example 12

Process 1

Reaction of an $(AB)_n$-polyethersiloxane with Methacrylate and Ethylhexyl Acrylate using Perkadox® 16 as an Initiator:

100 g of polyethersiloxane from reference example 6 were heated to 82° C. in a four-necked flask equipped with a stirrer, jacketed coiled condenser, thermometer and dropping funnel under a nitrogen atmosphere. On reaching the temperature, 20 g of a 1:1 mixture of methacrylate and ethylhexyl acrylate and 5.4 g of Perkadox® 16 were added dropwise in the course of 60 minutes, an exothermic reaction being observed. The reaction mixture was then kept at 100° C. for one hour. Thereafter, with the use of a distillation bridge, residual monomers were distilled off at 150° C. and under a vacuum from an oil pump. A colorless, clear product was obtained.

Reference Example 13

Process 2

Reaction of a polyether with methacrylate and ethylhexyl acrylate using Trigonox® B as an initiator:

100 g of dihydroxypolyether from reference example 2 were heated to 82° C. in a four-necked flask equipped with a stirrer, jacketed coiled condenser, thermometer and dropping funnel under a nitrogen atmosphere. On reaching the temperature, 20 g of a 1:2 molar mixture of methacrylate and ethylhexyl acrylate and 5.4 g of Perkadox® 16 were added dropwise in the course of 60 minutes, an exothermic reaction being observed. The reaction mixture was then kept at 100° C. for one hour. Thereafter, with the use of a distillation bridge, residual monomers were distilled off at 150° C. and under a vacuum from an oil pump. A colorless, clear product was obtained.

Reference Example 14

Process 2

Preparation of an $(AB)_n$-polyethersiloxane:

712 g of the grafted polyether from reference example 13 were initially introduced into a three-necked flask having a stirrer, distillation bridge and gas inlet tube, and the same amount of toluene was added. After about 200 g of toluene had been distilled off for azeotropic drying of the polyether, cooling to 75° C. was effected, the distillation bridge was exchanged for a dropping funnel and 288 g of an $\alpha,\omega$-dichlorodimethylpolysiloxane (B) (chain length=15) were added dropwise in the course of 30 min. After a subsequent reaction time of 1 h at 80° C., neutralization was effected with ammonia, ammonium chloride was filtered off and the mixture was freed from the solvent.

Testing of Performance Characteristics:

Testing of the Antifoam Action in Commercially Available Polymer Dispersions:

For the following comparison, the grafted polyoxyalkylene-polysiloxane block copolymers P prepared according to the invention were compared with the corresponding ungrafted polyoxyalkylene-polysiloxane block copolymers with regard to defoaming and compatibility before and after low-temperature storage. The test was performed using the acrylate dispersion Primal® SF-016, from Rohm-Haas.

The following formulations were prepared for this purpose:

| | |
|---|---|
| 110.00 g | of binder (acrylate dispersion, Primal ® SF-016, Rohm-Haas) |
| 0.44 g | of antifoam |

The antifoams according to the invention and not according to the invention were first incorporated for 3 minutes at 1000 rpm by means of a turbine stirrer (diameter 4 cm).

Thereafter, the following investigations were carried out:

50 µm knife coating on glass:

The stirred substance was applied in a wet layer thickness of 50 µm to a piece of glass by means of a knife coater. After drying, the compatibility of the antifoam was assessed by visual observation of the resulting wetting defects.

Thereafter, 100 g of the mixture of binder and antifoam were foamed at 2500 rpm for one minute. Immediately after the end of stirring, 50 ml were transferred to a calibrated volumetric flask and weighted. The air volume entrained could then be calculated according to % by volume of air=$100-2 \cdot G_R/\gamma$ ($G_R$=weight of the stirred substance, $\gamma$=density of the unstirred substance).

The tests were repeated at intervals after storage for several days at 4° C.

In table 1 below, the results which have been obtained with the grafted polyoxyalkylene-polysiloxane block copolymers according to the invention are compared with those of commercially available ungrafted antifoams.

TABLE 1

| Antifoam | Foam volume RT | Wetting defects | Foam volume storage (4° C.) 1 day | Wetting defects | Foam volume storage (4° C.) 7 days | Wetting defects |
|---|---|---|---|---|---|---|
| No antifoam | 80 | none | 80 | none | 80 | none |
| Comparison according to DE-A-31 23 103 | 65 | isolated | 75 | pronounced | 80 | pronounced |
| Reference example 6 | 50 | none | 60 | none | 80 | none |
| Reference example 9* | 52 | none | 53 | none | 51 | none |
| Reference example 10* | 49 | none | 49 | none | 50 | none |
| Reference example 11* | 60 | none | 62 | none | 65 | none |

TABLE 1-continued

| Antifoam | Foam volume RT | Wetting defects | Foam volume storage (4° C.) 1 day | Wetting defects | Foam volume storage (4° C.) 7 days | Wetting defects |
|---|---|---|---|---|---|---|
| Reference example 12* | 47 | none | 47 | none | 50 | none |
| Reference example 14* | 42 | none | 43 | none | 44 | none |

*grafted polyoxyalkylene-polysiloxane block copolymer according to the invention As is evident from table 1, the grafted polyoxyalkylene-polysiloxane block copolymers according to the invention are suitable for defoaming an aqueous dispersion with simultaneously good compatibility and, in contrast to commercially available antifoams based on ungrafted polyoxyalkylene-polysiloxane block copolymers, are characterized by substantially improved low-temperature stability. The examples according to the invention illustrate the improved low-temperature stability which is achieved by the free radical grafting of commercially available polyoxyalkylene-polysiloxane block copolymers and shows substantial advantages of the performance of the product after storage for only 24 h at 4° C. Furthermore, those other properties of these examples which are relevant for use show no significant changes in relation to the comparative examples.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:

1. A method of defoaming an aqueous solution or dispersion which comprises of adding an effective amount of a grafted copolymer P based on polyoxyalkylene-polysiloxane block copolymers of the general formula (I)

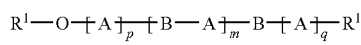  (I)

in which the radical
A is a polyoxyalkylene block of the average formula (II)

$$[(C_2H_{4-d}R'_dO)_n(C_xH_{2x}O)_r(C_2H_{4-d}R''_dO)_t] \quad (II)$$

in which
d is from 1 to 3,
n is $\geq 0$,
x is from 2 to 10,
r is $\geq 0$,
t is $\geq 0$,
n+r+t is $\geq 1$,
and
R' is a monovalent aromatic, optionally substituted hydrocarbon radical,
R" is a hydrogen radical or a monovalent hydrocarbon radical having 1 to 18 C atoms,
$R^1$ is an H atom, a monovalent organic linear or branched alkyl radical having the chain length $C_1$-$C_{40}$ or a carboxyl radical of an optionally branched alkyl or aryl ester, B is a polysiloxane block of the average formula (III)

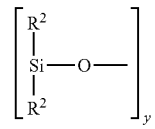  (III)

in which
$R^2$ are identical or different and comprise an alkyl radical having 1 to 4 carbon atoms or a phenyl radical and
y has a value from 5 to 200,
m has a value from 2 to 100,
p has a value from 0 to 1 and
q has a value from 0 to 1,
or of the formula (IV)

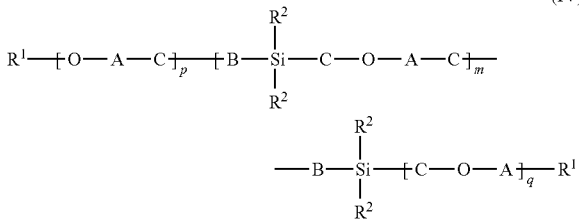  (IV)

in which the radicals $R^1$, A, B and m, p and q have the abovementioned meaning and
C is a linear or branched alkylene radical having 2 to 20 carbon atoms, to an aqueous solution or dispersion.

2. The method as claimed in claim 1, wherein, in the formula (II), d is 1, R' is phenyl and $1 \geq n < 15$.

3. The method as claimed in claim 1, wherein the grafted copolymer P is prepared by free radical graft polymerization of ethylenically unsaturated monomers M in the presence of polyoxyalkylene-polysiloxane block copolymers of the formulae (I) or (IV).

4. The method as claimed in claim 1, wherein the free radical graft polymerization of ethylenically unsaturated monomers M is carried out in the presence of dihydroxy-functional polyethers of the general formula (VI)

$$[HO(C_2H_{4-d}R'_dO)_n(C_xH_{2x}O)_r(C_2H_{4-d}R''_dO)_tH] \quad (VI)$$

in which R', R", d, n, x, t and r have the meanings stated in claim 1 in the description of the polyoxyalkylene block A.

5. The method as claimed in claim 3, wherein the amount of the ethylenically unsaturated monomers M, based on the polyoxyalkylene-polysiloxane block copolymers, is from 2 to 500% by weight.

6. The method as claimed in claim 3, wherein the monomers M are selected from the group consisting of acrylic acid, methacrylic acid, vinyl ethers, vinyl alcohols, vinyl esters, styrene and mixtures and derivatives thereof.

7. The method as claimed in claim 6, wherein the monomers M comprise derivatives of acrylic acid and methacrylic acid of the general formula (VII)

$$X\text{---}C(O)CR^7\text{=}CHR^6 \quad (VII)$$

in which $R^7$ and $R^6$, independently of one another, are selected from the group consisting of —H, linear $C_1$-$C_8$-alkyl chains or branched $C_1$-$C_8$-alkyl chains, methoxy, ethoxy, 2-hydroxyethoxy, 2-methoxyethoxy and 2-ethoxyethyl, X is selected from the group consisting of the radicals OH, OL, $OR^8$, $NH_2$, $NHR^8$, $N(R^8)_2$, $R^8$ are linear $C_1$-$C_{40}$-alkyl radicals, branched $C_3$-$C_{40}$-alkyl radicals, aromatic alkyl radicals or carbocyclic $C_3$-$C_{40}$-alkyl radicals, polyfunctional $C_6$-$C_{12}$ alcohols having 2 to 10 hydroxyl groups, such as ethylene glycol, hexylene glycol, glycerol and 1,2,6-hexanetriol, or alcohol ethers, such as methoxyethanol and ethoxyethanol or polyethylene glycols, L is a cation selected from the group consisting of $Na^+$, $K^+$, $Mg^{2+}$, $Ca^{2+}$, $Zn^{2+}$, $NH_4^+$, alkylammonium, dialkylammonium, trialkylammonium, tetraalkylammonium and analogous phosphoramine derivatives.

8. The method as claimed in claim 3, wherein the monomers M are selected from the group consisting of styrene, methylstyrene, tert-butylstyrene, styrene derivatives and mixtures of these monomers.

9. The method as claimed in claim 3, wherein the monomers M are selected from the group consisting of the vinyl and allyl esters of linear $C_1$-$C_{40}$-carboxylic acids, branched $C_3$-$C_{40}$-carboxylic acids or carboxylic $C_3$-$C_{40}$-carboxylic acids, vinyl acetate, vinyl propionate, vinyl neononanoate, vinyl neoundecanoic acid, vinyl tert-butyl benzoate, vinyl, allyl halides and mixtures of these monomers.

10. The method as claimed in claim 3, wherein the monomers M are selected from the group consisting of the nitrogen-containing monomers.

11. The method as claimed in claim 10, wherein the monomers M comprise N,N-dialkylaminoalkyl acrylates and methacrylates and N-dialkylaminoalkylacrylamides and -methacrylamides of the general formula (IX)

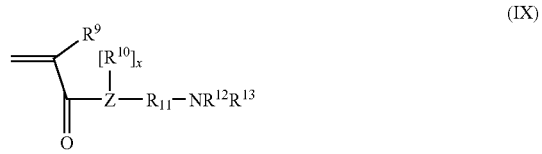

(IX)

in which $R^9$ is H or alkyl having 1 to 8 C atoms, $R^{10}$ is H or methyl $R^{11}$ is alkylene having 1 to 24 carbon atoms, optionally substituted by alkyl, $R^{12}$, $R^{13}$ are a $C_1$-$C_{40}$-alkyl radical, Z is nitrogen for x=1 or oxygen for x=0.

12. The method as claimed in claim 10, wherein the monomers M comprise N-vinylimidazoles of the general formula (VIII)

(VIII)

in which $R^{14}$ to $R^{16}$, independently of one another, are hydrogen, $C_1$-$C_4$-alkyl or phenyl.

13. The method as claimed in claim 1, wherein the grafted polyoxyalkylene-polysiloxane copolymer is present in a concentration from 0.01 to 20% by weight, based on the total weight of the solution or dispersion.

14. The method as claimed in claim 5, wherein the amount of the ethylenically unsaturated monomers M, based on the polyoxyalkylene-polysiloxane block copolymers, is from 2 to 200% by weight.

15. The method as claimed in claim 14, wherein the amount of the ethylenically unsaturated monomers M, based on the polyoxyalkylene-polysiloxane block copolymers, is from 2 to 100% by weight.

* * * * *